United States Patent [19]
Decky et al.

[11] Patent Number: 5,351,920
[45] Date of Patent: Oct. 4, 1994

[54] PIPE SUPPORT

[75] Inventors: John R. Decky, Vero Beach, Fla.; Louis F. Atzel, Boone, N.C.

[73] Assignee: Pipe Tytes, Inc., Boone, N.C.

[21] Appl. No.: 45,591

[22] Filed: Apr. 9, 1993

[51] Int. Cl.5 .............................. F16L 3/00
[52] U.S. Cl. ..................... 248/73; 248/222.3; 248/231.7; 248/74.1; 411/437
[58] Field of Search ............... 248/73, 250, 74.1, 58, 248/300, 59, 74.2, 61, 222.3, 62, 231.7, 63, 230; 411/437, 436

[56] References Cited

U.S. PATENT DOCUMENTS

| | | | |
|---|---|---|---|
| 1,495,189 | 5/1924 | Mack | 248/231.7 X |
| 1,601,612 | 9/1926 | Edwards | 248/231 |
| 2,942,314 | 6/1960 | Debner et al. | 248/61 X |
| 3,006,231 | 10/1961 | Kahn | 411/437 X |
| 3,423,055 | 1/1969 | Fisher | 248/73 |
| 3,696,233 | 10/1972 | Pulsifer | 248/230 X |
| 4,473,205 | 9/1984 | Rumble | 248/58 |
| 4,548,327 | 10/1985 | Kilkelly | 248/250 X |
| 4,550,891 | 11/1985 | Schäty | 248/74.2 X |
| 4,646,998 | 3/1987 | Pate | 248/250 |
| 4,722,648 | 2/1988 | Camilleri | 248/250 X |
| 4,861,081 | 8/1989 | Satoh | 411/437 X |
| 4,864,697 | 9/1989 | Sparks et al. | 248/74.2 X |
| 5,024,405 | 6/1991 | McGuire | 248/73 |
| 5,149,040 | 9/1992 | Heath | 248/300 |

FOREIGN PATENT DOCUMENTS 505769  12/1954  Italy .................. 248/222.3

Primary Examiner—David A. Scherbel
Assistant Examiner—Korie H. Chan
Attorney, Agent, or Firm—Aquilino & Welsh

[57] ABSTRACT

A tubular conduit support for supporting pipes and similar members from a threaded rod including a base member, a pair of C-shaped threaded clips for mounting the support on the threaded rod and a U-shaped clamp on the other side of the base member for supporting the pipe. Resilient fingers maintain the rod in place in the threaded clamps and the pipe in place in the U-shaped clamp.

9 Claims, 2 Drawing Sheets

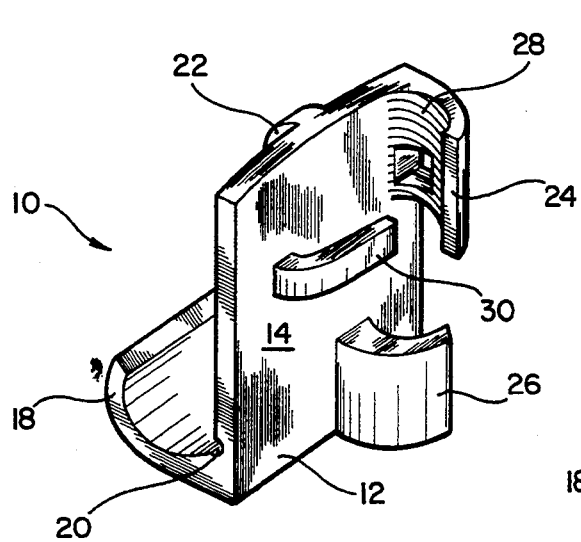
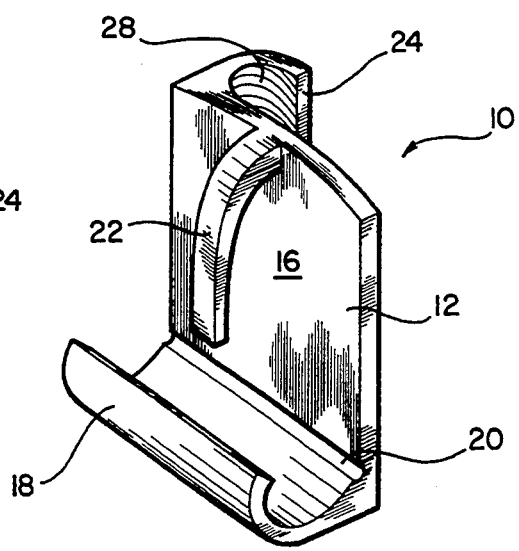
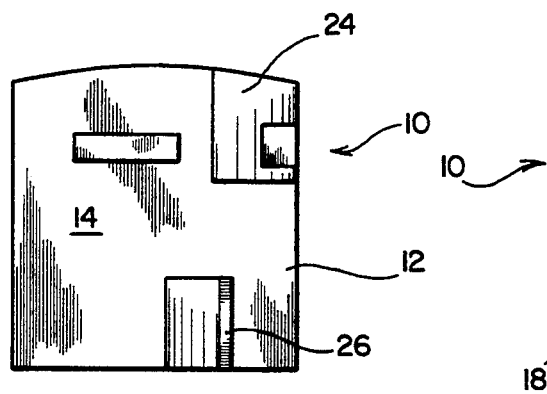
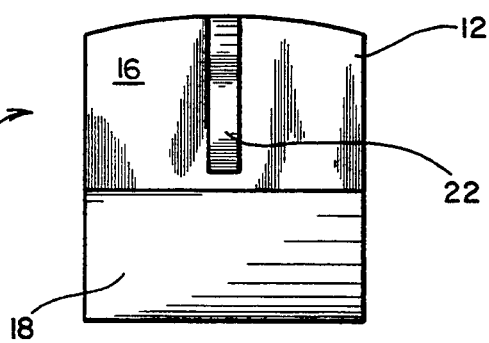
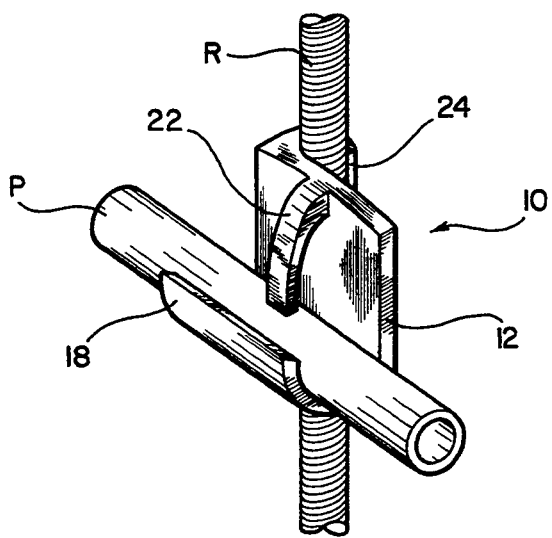

PIPE SUPPORT

BACKGROUND AND SUMMARY OF THE INVENTION

The present invention relates to a device for securing tubular conduits in a building structure, and more particularly, to a conduit support which engages a threaded rod to hang a conduit therefrom.

In the construction of a building, after the initial framework is prepared, it becomes necessary to hang various tubular conduits such as water pipes, electric conduits, vent lines, air conditioning drains and the like from the framework. Often, there are substantial lengths of the pipe or conduit which are unsupported. Because of the weight of the pipe itself and/or the material either flowing through or being held within the pipe, the pipe will bend or flex, creating undesired stresses. These stresses can lead to the failure of pipe joints and fixtures attached thereto, so there is a need to efficiently and inexpensively support these pipes. There have been a number of prior art devices for holding a length of unsupported pipe, including U-shaped members which are hooked to a rigid support, open loop members formed of resilient material wrapped around the pipe and attached to a support, and a variety of other clamp members.

Prior art patents of interest include a U.S. patent to Quanstrom (U.S. Pat. No. 2,108,347), which shows a tubing clip having a portion which serves to retain the tubing in place within the support, a patent to Gollin et al. (U.S. Pat. No. 4,470,179), which shows a U-shaped support clip including retaining fingers for keeping a pipe or tube in place, a French patent (2,599,567), directed to a table clip including a hook-like support member and a pair of oppositely disposed clips on the opposite side thereof, and a patent to McGuire (U.S. Pat. No. 5,024,405), which shows a pipe clamp having a base with opposing clips and a pipe gripper using a tongue and fork with interlocking teeth on guide prongs for retaining the pipe in place.

Whereas these devices are adequate for their particular use, a need exists for a pipe clamp which may be selectively fixed to a threaded ceiling support rod extending downwardly from a ceiling to support, for example, a dropped ceiling grid, a lighting, heating or air conditioner fixture or the like.

The present invention is directed to a reusable pipe support which may be selectively applied to a threaded rod in a building structure to enable a pipe or similar conduit to be supported therefrom. The pipe support is formed of a base panel including a pair of C-shaped threaded mounting clips on one side of the base panel and a larger U-shaped conduit clamp formed on the opposite side of the base panel. The pipe support is directly attached to a threaded support rod using the pair of oppositely disposed threaded clips, which requires no additional tools or fastener members and is attached to the rod by a simple rotation of the pipe support relative to the threaded rod. Once the rod is in place within the clips and engaged by the threads of the mounting clips, a retaining finger keeps the threaded rod from slipping out of the clips when supporting a pipe. A U-shaped pipe clamp is integrally attached to the base panel on the side opposite the mounting clips. The U-shaped clamp has a degree of flexibility which enables it to expand slightly when a pipe is forced within the U-shaped opening. A retaining finger maintains the pipe in place so that the pipe will not come loose during normal use. The flexibility of the pipe support enables a pipe to be removed from the U-shaped clamp with the exertion of a minimum amount of force. In addition, the pipe support may be removed from the threaded rod, should it become necessary to relocate the support during the installation process.

Among the objects of the present invention are a pipe support which is simple to use and easy to install, and requires no separate tools or fastener devices.

Another object is the provision of a pipe support which may be adjustably positioned on a threaded rod to support a wide variety of pipe systems and/or other tubular structures normally found in a building.

A further object is the provision of a pipe support which rigidly holds a pipe in place but which easily can be removed for relocation or dismantling.

These and other objects will become apparent with reference to the following specification and drawings.

BRIEF DESCRIPTION OF THE DRAWINGS

FIG. 1 is a perspective view of the pipe support of the present invention.

FIG. 2 is a perspective view taken from the opposite side of FIG. 1.

FIG. 3 is a perspective view of the support of the present invention mounted on a threaded rod and supporting a length of pipe.

FIG. 4 is a rear elevational view of the support of FIG. 1.

FIG. 5 is a front elevational view.

DESCRIPTION OF THE PREFERRED EMBODIMENTS

Figure 6:
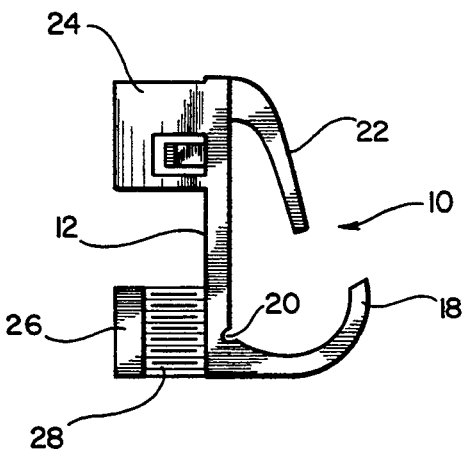
FIG. 6 is a side elevational view.
Figure 7:
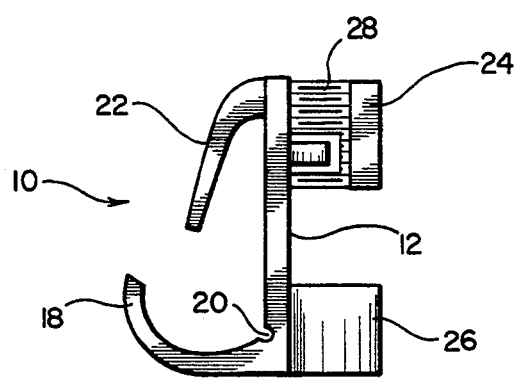
FIG. 7 is a side elevational view taken from the opposite side of FIG. 6.
Figure 8:
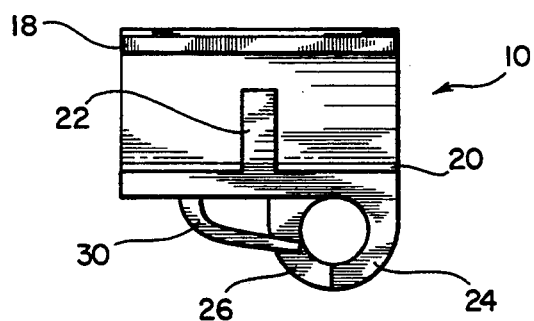
FIG. 8 is a top plan view.
Figure 9:
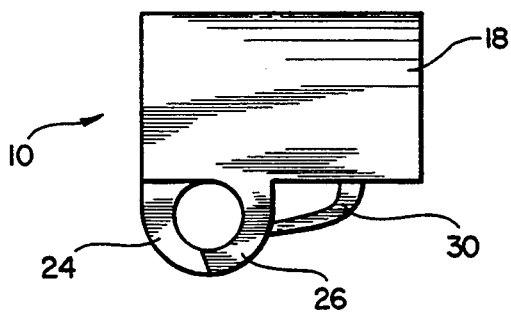
FIG. 9 is a bottom view.

Referring to the drawings, a pipe P is supported by a conduit support 10 of the present invention mounted on a threaded rod R. The rod R is a type used to conventionally support dropped ceilings in various types of commercial buildings. Normally, the rods are rigidly attached to the underside of a roof or upper floor, and hang vertically to support a ceiling grid which in turn is used to support individual panels of a suspended ceiling. The support 10 is formed as a unitary molded member, and includes a base panel 12 including opposing planar panel faces 14 and 16. As shown in the drawings, a U-shaped pipe clamp 18 is integrally attached to the panel 12 at one lower edge thereof. The pipe clamp 18 is semi-resilient and has a slight degree of flexibility, enabling it to expand because of a groove 20 which acts as a hinge formed adjacent the juncture of the clamp 18 and the base panel 12. A retaining finger 22 is formed on the panel 12 opposite the opening of the clamp 18. The finger 22 is resilient and movable toward the face 16 of the base panel 12, permitting a pipe to be inserted or snapped into the clamp opening and retaining the pipe once it is in place by the end of the retaining finger 22. The opposite face 14 of the panel includes a pair of oppositely disposed C-shaped clips 24 and 26, each of which have internal threads 28 for engagement with the threaded rod, as described hereinbelow. A retention finger 30 is provided opposite the opening in the C-shaped clip 24 to maintain the threaded rod R in place when the support 10 is properly mounted.

Since threaded rods normally hang vertically at an installation site and pipes and other conduits are normally mounted in a horizontal direction, the U-shaped clamp 18, formed at an edge on one side of the base panel 12, and the C-shaped clips 24 and 26 formed at an edge of the opposite side of the base panel 12, are disposed at right angles to each.

Figure 10:
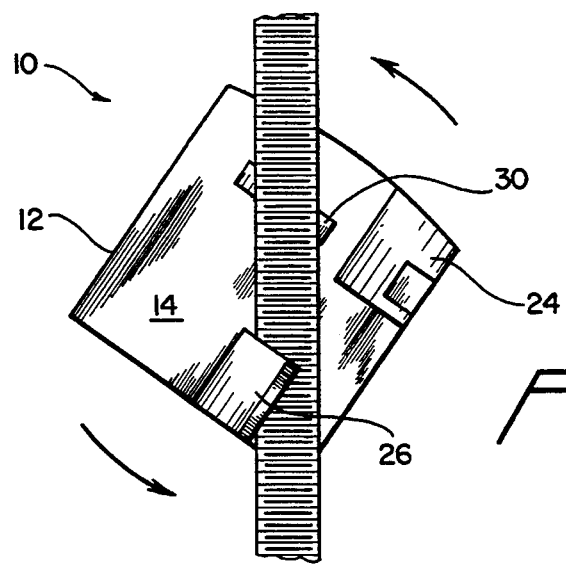
FIG. 10 is a view of the pipe support and a threaded rod showing the engagement of the support and bar by rotation of the pipe support.

Referring to FIG. 10, it will be understood that the pipe support 10 is mounted on the threaded rod R by placing the face 14 of base panel 12 against the threaded rod R so that the rod R sits between the C-shaped clips 24 and 26, respectively. Rotating the pipe support 10 counterclockwise permits the rod R to snap into the openings in the C-shaped clips 24 and 26. The retention finger 30 holds the rod R so that it will not slip out without the application of a significant force. The threads 28 in the clips 24 and 26 have the same diameter and pitch as the threads on the rod R, and a tight fit is provided, eliminating the possibility of the pipe support 10 slipping due to the downward force of the pipe and/or other stresses normally found in buildings.

It will be appreciated that each of the C-shaped clips 24 and 26 has a slight degree of resiliency to permit the support 10 to be easily snapped onto the rod R during installation. It will also be appreciated that the threads on the C-shaped clips 24 and 26 allow the pipe support 10 to be moved vertically in an upward or downward direction by simply rotating the pipe support 10 in much the same way as one would run a nut up and down the threads.

Once the pipe support 10 is in place on the rod R, the pipe P may be snapped in place in the U-shaped clamp 18. Finger 22 maintains the pipe P in place in the support 10 so that it will not jar loose by the building stresses.

The installation of the pipe P in the pipe support 10 exerts a downward force which holds the pipe support 10 in a vertical position, thereby increasing contact of the threaded clips 24 and 26 with the threaded rod R, thereby maintaining the pipe support 10 in place without having to rely upon the retention finger 30.

It will be appreciated that the pipe support may be made in a variety of sizes and combinations, depending upon the size of the threaded rod and the pipe or conduit being supported. The clips and clamps preferably are at right angles to each other, but for specific installations, they may be formed in the same direction.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. In combination with a suspended threaded rod, a support for a tubular conduit comprising:
   a base member;
   a pair of C-shaped clips integrally formed on a first planar side of said base member;
   each of said C-shaped clips having a rounded threaded opening sized to interconnect with the threaded rod for mounting the support on the threaded rod;
   a U-shaped clamp integrally formed on a second planar side of said base member opposite said first planar side for supporting said tubular conduit on said support;
   means for maintaining said rod in said C-shaped clips formed by a resilient finger positioned on said first planar side of said base member;
   said finger being perpendicular to said rod when said support is attached thereto; and,
   means for maintaining said tubular conduit in said U-shaped clamp.

2. The combination of claim 1 wherein said means for maintaining said tubular conduit in said U-shaped clamp is a resilient finger formed on said second planar side of said base member; said finger being further characterized by being positioned perpendicular to the tubular conduit when said tubular conduit is positioned in said U-shaped clamp.

3. The combination of claim 1 wherein one of said pair of C-shaped clips are formed on an edge of said first planar side of said base member and said U-shaped clamp is formed on an edge of said second planar side of said base member; said first planar side edge and said second planar side edge being disposed at right angles to each other.

4. The combination of claim 1 further including a slot formed at a juncture of said base member and said U-shaped clamp; said slot providing a semi-resilient connection at said juncture, enabling the tubular conduit to be snapped in place within an opening of said U-shaped clamp.

5. In combination with a suspended threaded rod, a support for a tubular conduit comprising:
   a base member;
   a pair of C-shaped clips integrally formed on a first planar side of said base member;
   each of said C-shaped clips having a rounded threaded opening sized to interconnect with the threaded rod for mounting the support on the threaded rod;
   a U-shaped clamp integrally formed on a second planar side of said base member opposite said first planar side for supporting said tubular conduit on said support;
   means for maintaining said rod in said C-shaped clips formed by a resilient finger positioned on said first planar side of said base member;
   said finger being perpendicular to said rod when said support is attached thereto;
   means for maintaining said tubular conduit in said U-shaped clamp including a second resilient finger positioned on said second planar side of said base member and,
   said second resilient finger being perpendicular to said tubular conduit when said tubular conduit is secured in said U-shaped clamp.

6. The combination of claim 5 wherein one of said pair of C-shaped clips are formed on an edge of said first planar side of said base member and said U-shaped clamp is formed on an edge of said second planar side of said base member; said first planar side edge and said second planar side edge being disposed at right angles to each other.

7. In combination with a suspended threaded rod, a support for a tubular conduit comprising:
   a base member having a first planar side and a second planar side opposite said first planar side;

a pair of C-shaped clips integrally formed on said first planar side whereby one of said pair of C-shaped clips are disposed on an edge of said first planar side of said base member;

each of said C-shaped clips having a rounded, threaded opening sized to interconnect with the threaded rod for mounting the support on the threaded rod;

a U-shaped clamp integrally formed on an edge of said second planar side for supporting said tubular conduit on said support; and, said edge of said first planar side and said edge of said second planar side being disposed at right angles to each other.

8. The combination of claim 7 further including a resilient finger positioned on said first planar side of said base member for maintaining said rod in said C-shaped clips, said finger being perpendicular to said rod when said support is attached thereto; and, a second resilient finger positioned on said second planar side of said base member for maintaining said tubular conduit in said U-shaped clamp, said second resilient finger being perpendicular to said tubular conduit when it is secured in said U-shaped clamp.

9. In combination with a suspended threaded rod, a support of a one piece structure for supporting a tubular conduit comprising:

a base member;

a pair of C-shaped clips integrally formed on a first planar side of said base member;

each of said C-shaped clips having a rounded threaded opening sized to interconnect with the threaded rod for mounting the support on the threaded rod;

a U-shaped clamp for supporting said tubular conduit on said support, said clamp integrally formed on a second planar side of said base member opposite said first planar side; and, said clamp being oriented at right angles with respect to said pair of C-shaped clips.

* * * * *